United States Patent
Abe

(10) Patent No.: US 9,413,449 B2
(45) Date of Patent: Aug. 9, 2016

(54) DIVERSITY RECEPTION APPARATUS, DIVERSITY RECEPTION METHOD, RECEPTION PROGRAM, AND RECORDING MEDIUM

(71) Applicant: PIONEER CORPORATION, Kanagawa (JP)

(72) Inventor: Yoshinori Abe, Kanagawa (JP)

(73) Assignee: PIONEER CORPORATION, Kanagawa (JP)

(*) Notice: Subject to any disclaimer, the term of this patent is extended or adjusted under 35 U.S.C. 154(b) by 0 days.

(21) Appl. No.: 14/765,421

(22) PCT Filed: Feb. 8, 2013

(86) PCT No.: PCT/JP2013/053040
§ 371 (c)(1),
(2) Date: Aug. 3, 2015

(87) PCT Pub. No.: WO2014/122771
PCT Pub. Date: Aug. 14, 2014

(65) Prior Publication Data
US 2015/0372745 A1    Dec. 24, 2015

(51) Int. Cl.
*H04B 7/02* (2006.01)
*H04B 7/08* (2006.01)
*H04L 1/02* (2006.01)
(Continued)

(52) U.S. Cl.
CPC ............... *H04B 7/08* (2013.01); *H04B 1/1027* (2013.01); *H04L 1/02* (2013.01); *H04L 27/01* (2013.01); *H04B 7/02* (2013.01)

(58) Field of Classification Search
CPC ............... H04L 1/02; H04B 7/02; H04B 7/08
See application file for complete search history.

(56) References Cited

U.S. PATENT DOCUMENTS 5,127,025 A * 6/1992 Okanoue ............... H04L 1/06
375/232
5,319,677 A * 6/1994 Kim ............... H04B 7/0845
375/341

(Continued)

FOREIGN PATENT DOCUMENTS

JP 4-79615 3/1992
JP 11-237419 8/1999

(Continued)

OTHER PUBLICATIONS

International Search Report, PCT/JP2013/053040, May 7, 2013.

(Continued)

*Primary Examiner* — Jean B Corrielus
(74) *Attorney, Agent, or Firm* — Young & Thompson

(57) ABSTRACT

A receiver having a high frequency selectivity noise tolerance is achieved on a small calculation scale by way of an received signal spectrum (RSS) calculation part, that calculates a received signal spectrum on the basis of a complex baseband signal (CBB) signal transmitted from a frontend, a channel frequency response (CFR) estimation part, that calculates an estimated channel characteristic and a residual signal on the basis of the CBB signal and estimated transmitted symbols estimated by a trellis decoder, and a noise power spectrum (NPS) estimation part, that calculates an estimated noise power spectrum on the basis of the residual signal calculated by the CFR estimation part. A combination part combines a plurality of received signal spectrums on the basis of the received signal spectrum, estimated channel characteristics and estimated noise power spectrum. An equalization part performs equalization of the combination result, thereby calculating an equalized spectrum.

12 Claims, 13 Drawing Sheets

(51) Int. Cl.
*H04L 27/01* (2006.01)
*H04B 1/10* (2006.01)

(56) References Cited

U.S. PATENT DOCUMENTS

| | | | | |
|---|---|---|---|---|
| 5,901,174 | A * | 5/1999 | Richard | H04L 1/06 333/28 R |
| 6,173,014 | B1 * | 1/2001 | Forssen | H04B 7/0845 375/267 |
| 6,438,362 | B1 | 8/2002 | Amezawa et al. | |
| 7,672,401 | B2 * | 3/2010 | Mysore | H04B 7/0845 370/203 |
| 8,045,610 | B2 | 10/2011 | Wang | |
| 8,666,004 | B2 * | 3/2014 | Kim | H04B 7/0617 375/347 |
| 2008/0030265 | A1 | 2/2008 | Ido et al. | |
| 2010/0046661 | A1 | 2/2010 | Yoshida et al. | |

FOREIGN PATENT DOCUMENTS

| | | |
|---|---|---|
| JP | 2006-067138 | 3/2006 |
| JP | 2011-023782 | 2/2011 |
| JP | 2012-049775 | 3/2012 |
| WO | WO 2006/059403 | 6/2006 |
| WO | WO 2008/090764 | 7/2008 |

OTHER PUBLICATIONS

Yasuharu Amezawa et al., "Effects of Directional Diversity Combining Using Residual Power of Radio Channel Estimation (B-5-60)", Proceedings of the Society Conference of IEICE, 1997 Nen, Tsushin (1), 1997.08, p. 313.

DTV Signal Reception and Processing Considerations (ATSC document No. T3-600r4) Sep. 18, 2003.

\* cited by examiner

{c(q)}: after masking

DIVERSITY RECEPTION APPARATUS, DIVERSITY RECEPTION METHOD, RECEPTION PROGRAM, AND RECORDING MEDIUM

TECHNICAL FIELD

The present invention relates to a diversity reception apparatus that receives and demodulates a signal digitally modulated according to a single carrier modulation format, to a diversity reception method, to a reception program, and to a recording medium upon which such a reception program is recorded.

BACKGROUND ART

In recent years, terrestrial digital broadcasting has spread worldwide. While there are a number of standards relating to terrestrial digital broadcasting, the ATSC (Advanced Television System Committee) standard is employed in the USA, Canada, Mexico, and South Korea. As a modulation method, this ATSC standard employs 8VSB modulation (8-ary Vestigial Sideband Modulation), which is a type of single carrier modulation.

Upon comparison of the ATSC standard with a standard that employs the multi-carrier modulation method of which the Japanese ISDB-T (Integrated Services Digital Broadcasting-Terrestrial) standard is representative, it has been pointed out that the multipath tolerance of the former is inferior. In particular, an extremely low dynamic multipath tolerance is demanded for mobile reception. Due to this, since the start of commercial broadcasting in 1998, no ATSC receiver has existed that, in practice, has acceptable performance for use in a moving vehicle.

However in recent years, due to the progression of digital demodulation technology, the possibility of mobile reception of ATSC signals has become higher. For example, in Patent Document #1, a receiver configuration is disclosed that is based upon, diversity reception and channel, transmission path estimation.

It is per se known that diversity reception mitigates multipath tolerance. In such diversity reception, the reception performance is improved by combining signals received by a plurality of antennas.

Moreover, a receiver configuration based upon channel estimation is replacing the prior art receiver configuration based upon an adaptive equalizer. With current ATSC receivers for fixed reception, a receiver configuration employing an adaptive equalizer has become widely used (refer to Non-Patent Document #1). However, with this prior art adaptive equalization technique, during mobile reception, it is difficult to track along a fast fading channel, and this situation is encountered quite often. In particular, the tracking speed gets lower in the case of a diversity receiver, with which it is also necessary to optimize the diversity combination coefficients, in addition to optimizing the equalization coefficients.

By contrast, with a receiver configuration that is based upon channel estimation, a channel impulse response (hereinafter "CIR") or a channel frequency response (hereinafter "CFR") is estimated for each diversity branch (hereinafter "branch"), and, by calculating the optimum diversity combination coefficients and equalization coefficients analytically on the basis of these estimations, it is possible to implement excellent tracking performance even for a fast fading channel.

PRIOR ART DOCUMENT

Patent Documents

Patent Document #1: U.S. Pat. No. 8,045,610.

Non-Patent Documents

Non-Patent Document #1: DTV Signal Reception and Processing Considerations (ATSC document number T3-600r4).

SUMMARY OF THE INVENTION

Problem to be Solved by the Invention

A modulated signal transmitted from a broadcasting station is received with noise of various kinds overlaid thereupon upon the channel, such as impulse noise, frequency selective noise, and so on. Thus, in the configuration of a receiver, it is a very important problem to enhance the tolerance to these various types of noise. In particular, with an onboard type receiver or a portable type receiver for which usage in many different types of reception environment may be assumed, it is necessary to provide high tolerance to frequency selective noise, which is radiated from electronic devices of various types.

For lowering the influence of this kind of frequency selective noise, it is necessary to estimate the power spectrum of the noise (hereinafter "NPS") that is superposed upon the received signal on each branch, and to calculate optimum diversity combination coefficients and equalization coefficients on the basis of this NPS estimation. However, with the technique of Patent Document #1 described above, it is not possible to implement high tolerance to frequency selective noise such as is demanded for an onboard type receiver or a portable type receiver, since it is assumed that the noise is so called white noise. Moreover, in Patent Document #1, there is no mention of any concrete channel estimation technique.

The object of the present invention is to implement a receiver whose frequency selective noise tolerance is high and that operates with small computation scale.

Means for Solving the Problems

Disclosed is a diversity reception apparatus that receives a digitally modulated signal by single carrier modulation, comprising: a plurality of branch processing parts to which a plurality of received signals are respectively inputted individually; a combining and equalizing part calculating an equalized signal from said plurality of received signals; and a transmitted symbol estimation part calculating an estimated transmitted symbol from said equalized signal; wherein each of said branch processing parts comprises: a channel estimation part calculating a channel characteristic; and a noise estimation part calculating an estimated noise power spectrum; wherein: said combining and equalizing part calculates said equalized signal on the basis of said channel characteristic and said estimated noise power spectrum, said channel estimation part comprises an adaptive filter that takes said estimated transmitted symbol as filter input and generates a desired filter output signal from said received signal, and calculates said estimated channel characteristic from filter coefficients of said adaptive filter, and said noise estimation part calculates said estimated noise power spectrum on the basis of a residual signal calculated by said adaptive filter.

Also disclosed is a diversity reception method employed by a diversity reception apparatus that receives a digitally modulated signal by single carrier modulation, comprising the steps of: a branch processing step of processing upon each of a plurality of received signals; a combining and equalizing step of calculating an equalized signal from said plurality of received signals; and a transmitted symbol estimation step of calculating an estimated transmitted symbol from said equalized signal; wherein said branch processing step comprises: a channel estimation step of calculating an estimated channel characteristic; and a noise estimation step of calculating an estimated noise power spectrum; wherein in said combining and equalizing step, said equalized signal is calculated on the basis of said estimated channel characteristic and said estimated noise power spectrum, in said channel estimation step, adaptive filter processing is performed by taking said estimated transmitted symbol as filter input and by generating a desired filter output signal from said received signal, and said estimated channel characteristic is calculated from filter coefficients of said adaptive filter processing, and, in said noise estimation step, said estimated noise power spectrum is calculated on the basis of a residual signal calculated by said adaptive filter processing.

Further disclosed is a non-transient computer readable medium having recorded thereon a reception program that, when executed, causes a computer in a diversity reception apparatus, which receives a digitally modulated signal by single carrier modulation, to execute the diversity reception method discussed above.

REFERENCE SIGNS LIST

Figure 1:
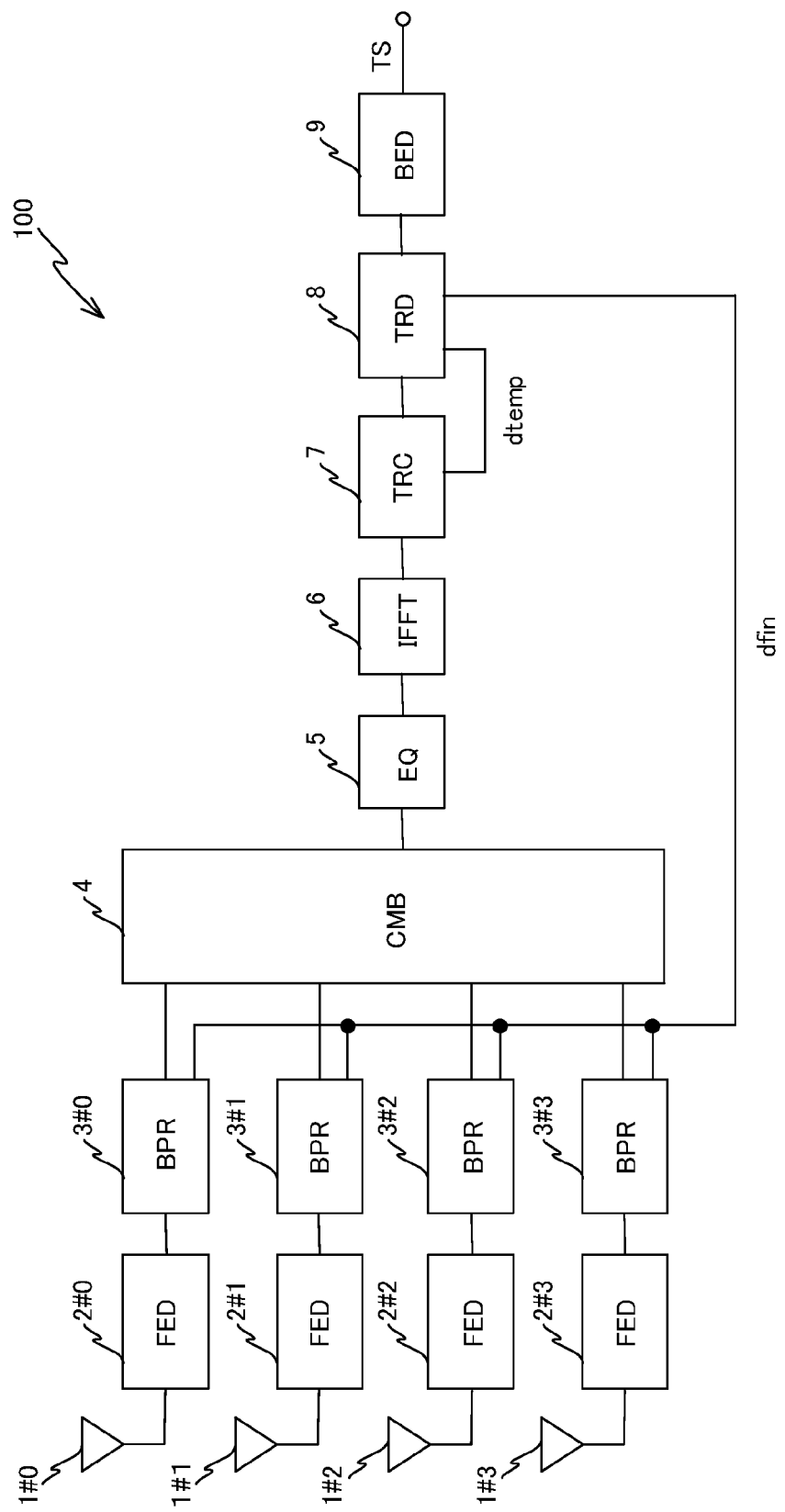
FIG. 1 is a block diagram of a receiver according to the embodiment #1.

100: receiver (diversity reception apparatus)
4: combination part (a portion of a combining and equalizing part)
5: equalizing part (a portion of the combining and equalizing part)
6: IFFT part (a portion of the combining and equalizing part)
7: correction part (a portion of the combining and equalizing part)
8: trellis decoder (a transmitted symbol estimation part)
11: data distribution part (a portion of a channel estimation part)
12: RSS calculation part (a portion of the combining and equalizing part)
13: CFR estimation part (a portion of the channel estimation part)
14: NPS estimation part (a noise estimation part)

Embodiments for Carrying Out the Invention

In the subsequent description, the following mathematical symbols are used:
$\pi$, pi: the circle circumference ratio
j: the imaginary unit
real(x): the real part of the complex number x
imag(x): the imaginary part of the complex number x
arg(x): the argument of the complex number x
exp(x): the exponential function of the complex variable x
conj(x): the complex number that is conjugate to the complex number x
a←b: update a with b In the following digital sequences and vector symbols, the following indices will be used without any particular mention. However these index symbols will be omitted as appropriate, provided that there is no risk of error.
s: segment index
b: branch index
k: time index
c: frequency index
q: tap index It will be supposed that an N-point FFT (Fast Fourier Transform) is given by the following equation:

[Formula 1]

$$F(c) = \frac{1}{\sqrt{N}} \sum_{k=0}^{N-1} f(k)\exp(-2\cdot\pi\cdot j\cdot c\cdot k/N) \quad (1)$$

Moreover, it will be supposed that an N-point IFFT (Inverse Fast Fourier Transform) is given by the following equation:

[Formula 2]

$$f(k) = \frac{1}{\sqrt{N}} \sum_{c=0}^{N-1} F(c)\exp(2\cdot\pi\cdot j\cdot c\cdot k/N) \quad (2)$$

Yet further, in the following description, an FFT without power normalization given by the following equation is also mentioned:

[Formula 3]

$$F(c) = \sum_{k=0}^{N-1} f(k)\exp(-2\cdot\pi\cdot j\cdot c\cdot k/N) \quad (3)$$

In this case, this will be explicitly described as an FFT without power normalization, in order to distinguish it from a normal FFT of the type mentioned above.

In the following, embodiments of the present invention will be explained with reference to the drawings. By way of example, a receiver for ATSC will be explained in the following. However, it would also be possible to apply the present invention to a receiver for some other type of single carrier modulated signal, for example to a receiver for a signal that is modulated according to the SC mode of the Chinese DTMB standard.

Note that, in the following explanation, the reference symbol that is appended to each element in the drawings is specified when the element is first mentioned, but if the element is not appearing for the first time, then mention of the reference symbol is sometimes omitted as appears appropriate, provided that there is no risk of error. Moreover, although block diagrams are used in the description of the drawings for explaining the details of signal processing, these block diagrams do not necessarily specify the hardware configuration of the receiver. The concrete hardware configuration for implementing the details of this signal processing may be of any desired type, such as LSI, FPGA, DSP, a combination of a CPU and software, or the like.

Embodiment #1

First, the embodiment #1 of the present invention will be explained.

Figure 2:
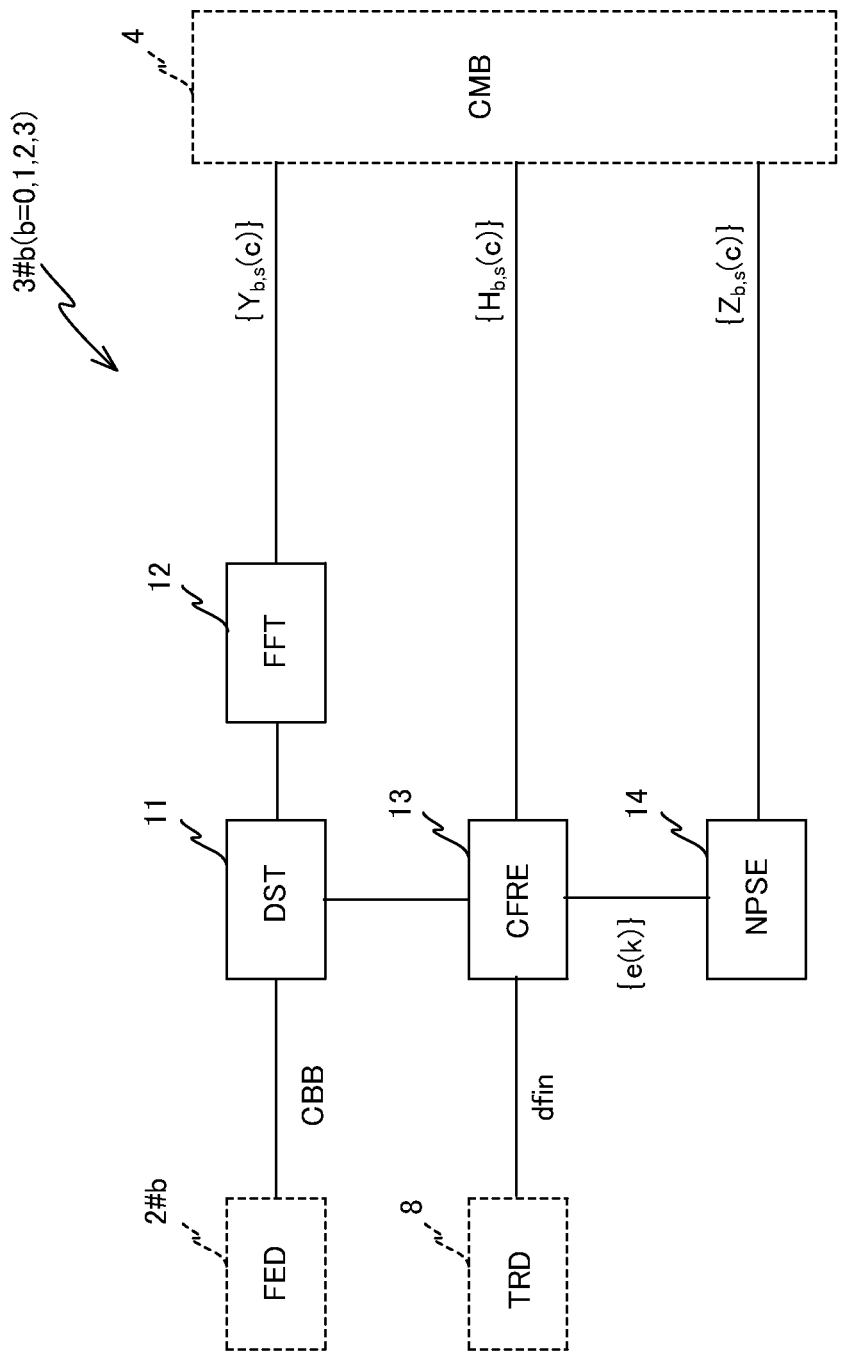
FIG. 2 is a block diagram of a branch processor (BPR) of FIG. 1.

Block diagrams are shown in FIGS. 1 and 2 for a receiver 100 according to the embodiment #1 of the present invention that employs ATSC. These block diagrams correspond to processing in the steady state. Generally, initial processing (acquisition) is performed before steady processing is performed. In this initial processing, establishment of frame synchronization and calculation of initial coefficients for an adaptive filter that will be described hereinafter are performed.

First the overall configuration of the receiver will be explained with reference to FIG. 1. This receiver comprises four antennas 1#b (where b=0, 1, 2, and 3; and similarly in the subsequent description), four front ends 2#b (FEDs) corresponding respectively to these antennas, four branch processors 3#b (BPRs) respectively corresponding to the antennas in a similar manner, a combining part 4 (CMB), an equalizing part 5 (EQ), an IFFT part 6 (IFFT), a correction part 7 (TRC), a trellis decoder 8 (TRD), and a back end 9 (BED). Note that, while the number of branches in the embodiment #1 is postulated as being four, a similar receiver configuration with a different number of branches would also be possible.

Each of the front ends extracts a desired channel component from the time-continuous RF (Radio Frequency) signal that is inputted from the corresponding antenna, and converts this to a complex baseband signal (hereinafter termed a "CBB signal") which is a discrete time sequence, and outputs the CBB signal. The front end that perform processing such as RF filtering, carrier frequency conversion to IF (Intermediate Frequency), IF filtering, A/D conversion, sampling frequency conversion and so on are typical. Here, it will be supposed that the modulation frequency of the CBB signal is zero. Moreover, it will be supposed that the sampling frequency of the CBB signal is synchronized to the symbol sending rate (about 10.76 MHz).

Figure 3:
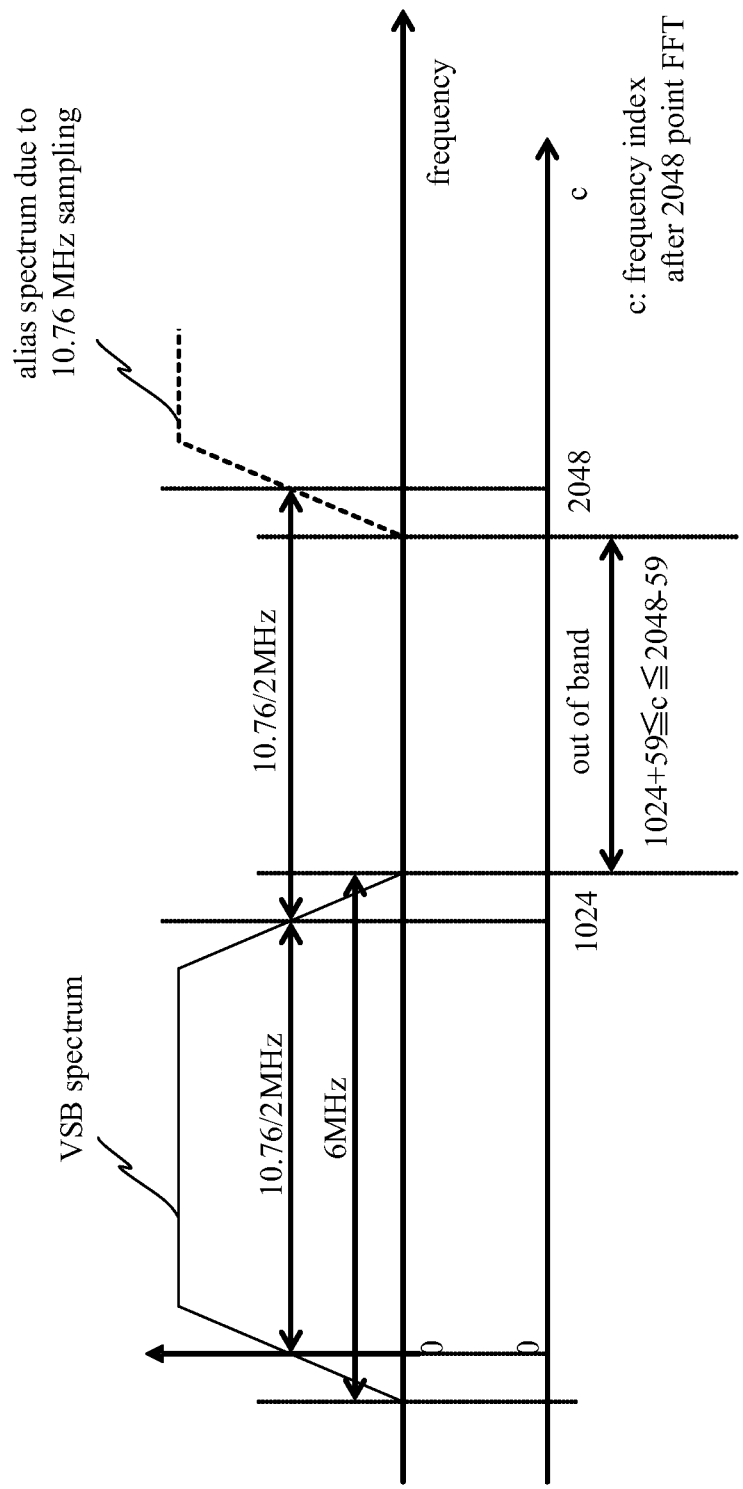
FIG. 3 is a figure for explanation of a hypothesized VSB spectrum in the embodiment #1.

Furthermore, it will be supposed that the VSB spectrum is located to the positive frequency side of the CBB signal, as shown in FIG. 3.

Each of the functional blocks of the embodiment #1 performs block unit processing (subsequently termed "segment processing") in synchronization with segments prescribed by the ATSC standard. Due to a single segment processing, an equalized signal having the length of a segment, in other words 832 symbols long, is outputted from the IFFT part.

Each of the branch processors performs processing upon the CBB signal that is inputted thereto, and, in the processing of each segment, calculates the received signal spectrum (subsequently, the "RSS"), an estimate of the CFR (subsequently, the "estimated CFR"), and an estimate of the NPS (subsequently, the "estimated NPS"). The RSS and the estimated CFR are N-point complex vectors, while the estimated NPS is a N-point real vector. Here, N is the number of FFT points, and in the embodiment #1 is supposed to be 2048. The vectors calculated in the s-th segment processing (where s=0, 1, 2, . . . ) by the b-th branch processor (3#b in FIG. 1) are specified as shown below. Note that the details of the branch processors will be described hereinafter.

$$\text{RSS: } \{Y_{b,s}(c): c=0,1,\ldots N-1\} \quad (4)$$

$$\text{Estimated CFR: } \{H_{b,s}(c): c=0,1,\ldots N-1\} \quad (5)$$

$$\text{Estimated NPS: } \{Z_{b,s}(c): c=0,1,\ldots N-1\} \quad (6)$$

The combining part combines the RSSs outputted from the branch processors on the basis of the estimated CFRs and the estimated NPSs. This combination is performed according to maximal-ratio combining and for each frequency bin. In concrete terms, a combined spectrum $\{D_s(c)\}$ is calculated according to the following equation:

[Formula 4]

$$D_s(c) = \sum_{b=0}^{3} \frac{conj(H_{b,s-1}(c))Y_{b,s}(c)}{Z_{b,s-1}(c)} \text{ for } c = 0, 1, \ldots, N-1 \quad (7)$$

Please note that, in connection with the estimated CFR and the estimated NPS, the values calculated in the previous segment processing, in other words the values in the (s−1)-th segment processing, are used. Moreover, it will be supposed that the estimated CFR and the estimated NPS that are used for combination in the first segment processing (s=0) are calculated in advance by the initial processing.

The equalizing part performs equalization according to an MMSE (Minimum Mean Square Error) criterion. First, the equalizing part calculates the frequency response $\{Q_s(c)\}$ after combination according to the following equation:

[Formula 5]

$$Q_s(c) = \sum_{b=0}^{3} \frac{|H_{b,s-1}(c)|^2}{Z_{b,s-1}(c)} \text{ for } c = 0, 1, \Lambda, N-1 \quad (8)$$

Subsequently the equalizing part calculates the equalization spectrum $\{V(c)\}$ according to the following equations. Here, $\sigma^2=21$ is the variance of the transmitted data. Note that the symbol for the segment index is omitted.

[Formula 6]

$$J(c)=Q(c)+Q(-c)+1/\sigma^2 \text{ for } c=0 \quad (9)$$

[Formula 7]

$$J(c)=Q(c)+Q(N-c)+1/\sigma^2 \text{ for } c=1,2,\Lambda,N-1 \quad (10)$$

[Formula 8]

$$V(c)=D(c)/J(c) \text{ for } c=0,1,\Lambda,N-1 \quad (11)$$

From the 2048 point complex vector obtained by performing IFFT on the equalization spectrum, the IFFT part outputs the 832 points in the central portion, which is obtained by excluding the leading 608 points and the trailing 608 points from the 2048 points, to the correction part as an equalized signal.

The correction part tracks the phase error, the DC offset, and the amplitude error included in the equalized signal provided from the IFFT part, and corrects them.

For each symbol, the correction is performed according to the following equations:

$$w = v \cdot \exp(2 \cdot pi \cdot j \cdot ph) \cdot g \qquad (12)$$

$$r = 2 \cdot \text{real}(w) + dc \qquad (13)$$

Here, v is the input signal to the correction part, and r is the output signal of the correction part. Moreover, ph is a phase correction value, g is a gain correction value, and dc is a DC offset correction value.

Each of the correction values is updated so that r approaches the temporal decision value. Methods of various kinds may be employed as the updating method. For example, it will be acceptable to perform updating for each symbol according to the following equations:

$$err = r - d\,\text{temp} \qquad (14)$$

$$\text{if } (|\text{imag}(w)| > 1)\,perr = -err/\text{imag}(w),\text{ else } perr = 0; \qquad (15)$$

$$\text{if } (|d\,\text{temp} + dc| > 3)\,gerr = err/(d\,\text{temp} + dc), \text{else } gerr = 0; \qquad (16)$$

$$g \leftarrow g - g\text{step} * gerr; \qquad (17)$$

$$ph \leftarrow ph - p\text{step} * perr; \qquad (18)$$

$$dc \leftarrow dc - d\text{step} * err; \qquad (19)$$

Here, dtemp is a temporal decision value, and gstep, pstep, and dstep are the update steps of the correction values.

Here, the temporal decision values provide estimated values of the transmitted symbols before the pilot is superposed, and are any one of the eight integer values $\{\pm 1, \pm 3, \pm 5, \pm 7\}$. In the simplest manner, these temporal decision values can be calculated by hard decision using an 8-value slicer. However, it is possible to obtain a less erroneous decision by employing a Viterbi algorithm. In the embodiment #1, a temporal decision value for each symbol is provided from a trellis decoder that will now be described.

The trellis decoder performs Viterbi decoding upon the corrected signal outputted from the correction part. The decoded bit sequence that is obtained is provided to the back end. Moreover, the trellis decoder provides a final decision value (dfin) to the branch processor and provides the temporal decision value to the correction part.

The calculation of the temporal decision value will now be explained. For each of the symbols that is inputted, the trellis decoder of the embodiment #1 is required to estimate the value of this transmitted symbol with very little delay, and is required to provide this estimate value to the correction part as a temporal decision value. In order to fulfill this requirement, the trellis decoder of the embodiment #1 calculates the temporal decision value by accompanying with ACS (Add-Compare-Select) processing performed for each input signal.

ACS processing is a per se known technique that is widely used in Viterbi decoding. Generally, in ACS processing, a plurality of survivor paths are determined upon a trellis diagram on the basis of the input symbols. Among a plurality of survivor paths that have been determined by the ACS processing, the trellis decoder of the embodiment #1 obtains the path whose likelihood is the highest, in other words the newest reference encoder output that corresponds to the maximum likelihood survivor path, and takes this as being the temporal decision value.

The calculation of the final decision value and the decoded bit sequence will now be explained. A corrected signal consisting of 832 symbols for each processing segment is inputted from the correction part to the trellis decoder of the embodiment #1. The trellis decoder performs the ACS processing previously described upon each symbol in this corrected signal. And, at the time point that the segment processing ends; the trellis decoder calculates a decoded bit sequence for the 832 symbols and a sequence of the final decision values, all together. The decoded bit sequence is calculated as the trellis reference encoder input sequence corresponding to the maximum likelihood survivor path at the time point that the segment processing ends. On the other hand, the sequence of final decision values is calculated as the trellis reference encoder output sequence corresponding to the maximum likelihood survivor path. Note that these final decision values give estimate values of the transmitted symbols after the pilot is superposed, and are any one of the eight integer values $\{\pm 1, \pm 3, \pm 5, \pm 7\}$, with a pilot DC component of 1.25 added thereto.

Note that symbols that are not trellis encoded (i.e., non-encoded symbols) are also inputted to the trellis decoder. For example, the first four symbols of each segment are the DSS (Data Segment Sync) prescribed by the ATSC standard, and the values thereof that have been transmitted are already known to be $\{5, -5, -5, 5\}$. Moreover, the first segment of the ATSC field includes a plurality of reserve bits. These reserve bits are not trellis encoded, and it is stipulated that the values thereof are only specified 5 or −5. The trellis decoder of the embodiment #1 does not perform Viterbi decoding if an input symbol corresponds to this type of non-encoded symbol. And, if the input symbol corresponds to an already known symbol, then the transmitted symbol value is used as its determined value. Furthermore, if the input symbol corresponds to a reserve bit, then a hard decision result reached with a two value slicer is used as its determined value.

The back end performs decoding processing of the series; in concrete terms, it performs deinterleaving, Reed-Solomon decoding, and derandomizing processing of various types, and outputs an MPEG transport stream (MPEG-TS) that is obtained as the result. This MPEG-TS is converted to video and audio by appropriate decoding processing.

The branch processors will now be explained. A block diagram of the interior of one of the branch processors is shown in FIG. 2. Each of the branch processors comprises a data distribution part (DST) 11, a RSS calculation part (FFT) 12, a CFR estimation part (CFR E) 13, and an NPS estimation part (NPSE) 14.

In each segment processing, the data distribution part extracts a section signal from the CBB signal, and provides it to the RSS calculation part and to the CFR estimation part. A section signal of 832 points that have been extracted so that there are no gaps or overlaps on the CBB signal is provided to the CFR estimation part in each segment processing. In other words, if the CBB signal is taken to be $\{cbb(k)\}$, then the section signal provided to the CFR estimation part in the s-th segment processing is $\{cbb(k): ko+832s \leq k < ko+832s+831\}$. Here, the value ko is determined by the initial processing. On the other hand, a section signal of 2048 points (the number of points N of the FFT) is provided to the RSS calculation part, with overlap intervals of 608 points each being added before and after the interval provided to the CFR estimation part.

The RSS calculation part calculates the RSS by performing a FFT upon the 2048 point section signal provided from the data distribution part for each segment processing.

The CFR estimation part estimates a CFR for each branch on the basis of the CBB signals provided from the data distribution part and the final decision values provided from the trellis decoder, and provides these CFRs to the combination part. Moreover, it also provides a residual signal obtained along with the estimation to the NPS estimation part.

Figure 4:
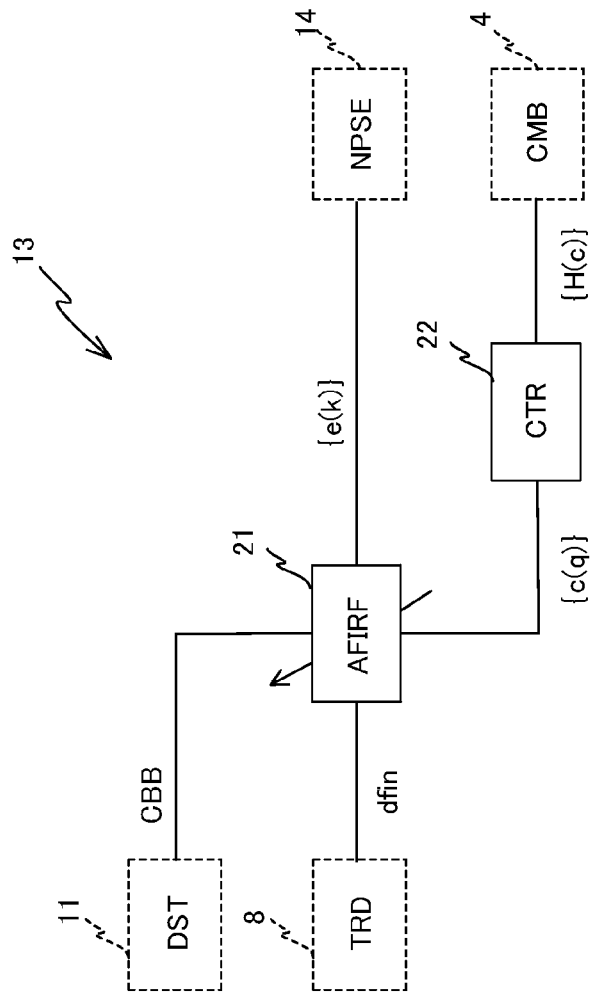
FIG. 4 is a block diagram of a CFR estimation part (CFRE) in the embodiment #1.

The configuration of the CFR estimation part of the embodiment #1 is shown in FIG. 4. The CFR estimation part of the embodiment #1 comprises an adaptive FIR filter (AFIRF) 21 and a coefficient transformation part (CTR) 22.

Figure 5:
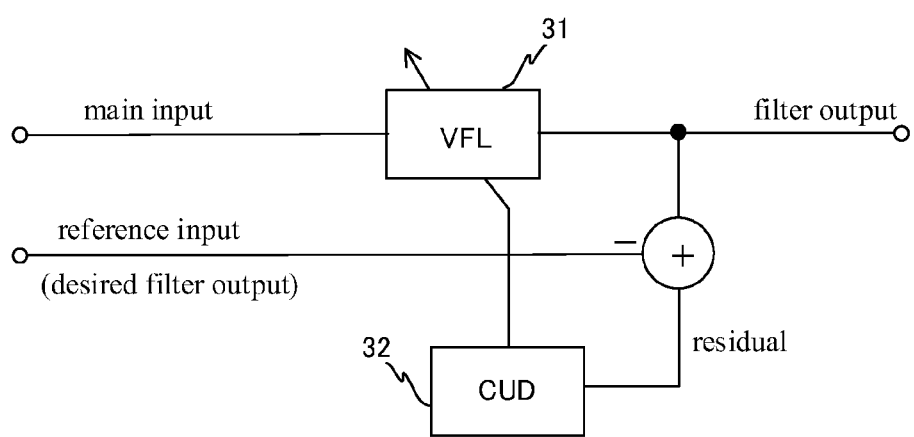
FIG. 5 is a block diagram of a normal type of adaptive filter.

Now, a per se known adaptive filter will be explained. A typical configuration for an adaptive filter is shown in FIG. 5. As shown in the figure, this adaptive filter comprises a variable coefficient filter (VFL) 31 and a coefficient updating part (CUD) 32. Generally, an adaptive filter requires two input signals. One of these is a main input signal that is inputted to the variable coefficient filter, while the other is a reference input signal that gives a desired filter output. The coefficient updating part updates the filter coefficients so that the filter output signal becomes closer to the desired filter output signal. In more detail, on the basis of a residual signal which is the difference between the actual filter output signal and the reference input signal, the coefficient updating part updates the filter coefficients so that the power of this residual signal becomes low.

The final decision values provided from the trellis decoder are sent to the adaptive FIR filter of the embodiment #1 as its main input signal. Moreover, the CBB signal provided from the data distribution part is sent as the reference input signal. As previously described, the adaptive FIR filter updates the coefficient vector of the FIR filter adaptively so that the FIR filter output becomes closer to the reference input signal. As a result, the coefficient vector provides an estimated value of the CIR.

A per se known LMS (Least Mean Square) algorithm is used for the coefficient updating. Note that it would also be possible to apply some other algorithm, for example a RLS (Recursive Least Squares) algorithm or the like.

The details of the processing by the adaptive FIR filter of the embodiment #1 will now be explained in the following. It will be supposed that, in the processing of some segment, the CBB signal provided from the data distribution part is $\{y(k): k=0, 1, \ldots 831\}$ and the sequence of final decision values provided from the trellis decoder is $\{d(k): k=0, 1, \ldots 831\}$. And it will be supposed that, in the embodiment #1, the tap length of the adaptive FIR filter is 512, the coefficient vector is $\{c(q): q=0, 1, \ldots 511\}$, and the tap vector is $\{x(q): q=0, 1, \ldots 511\}$. At this time, the processing of the adaptive FIR filter for each symbol is given by the following equations:

$$\{x(0),x(1),\ldots,x(511)\} \leftarrow \{d(k),x(0),\ldots,x(510)\} \quad (20)$$

$$y'(k)=c(0)x(0)+c(1)x(1)+\ldots+c(511)x(511) \quad (21)$$

$$e(k)=y'(k)-y(k) \quad (22)$$

$$c(q) \leftarrow c(q)-\mu e(k)x(q) \text{ for } q=0,1,\ldots,511 \quad (23)$$

Equation (20) shows the shift processing of the tap vector. By using equation (21), the output y'(k) of the adaptive FIR filter is calculated as being the sum of products of the coefficient vector and the tap vector. By using equation (22), the residual signal e(k) is calculated as being the differential between this y'(k) and the CBB signal that has actually been received. And, in equation (23), the coefficient vector is updated according to a LMS algorithm. Due to this updating, the power of the residual signal is minimized. Note that μ, is the updating step. With the adaptive FIR filter of this example, the processing described above is performed 832 times in the processing for each segment, in other words for $k=0, 1, \ldots 831$. The residual signal $\{e(k): k=0, 1, \ldots 831\}$ is provided to the NPS estimation part.

It will be supposed that the initial value of the coefficient vector is calculated by the initial processing. The initial value may be calculated by any one of various methods; for example, it could be calculated on the basis of correlation between the CBB signal and the sequence PN511 prescribed by the ATSC standard.

The coefficient transformation part calculates the estimated CFR on the basis of the coefficient vector $\{c(q): q=0, 1, \ldots 511\}$ at the time point that the adaptive FIR filter has completed the segment processing described above.

In concrete terms, the coefficient calculation part calculates the estimated CFR according to the following equations:

$$\{c'(q): c=0,1,\ldots,2047\}=\{c(0),c(1),\ldots,c(511), 0,0,0,\ldots 1\} \quad (23a)$$

$$\{H'(c): c=0,1,\ldots,2047\}=\text{FFT}(\{c'(q)\}) \quad (23b)$$

if $(1024+59 \leq c \leq 2048-59)$ then $H(c)=0$,
else $H(c)=H'(c)$ \quad (23c)

According to equation (23a), the coefficient vector is extended to an N-point vector by zero padding. Then, by using equation (23b), the frequency response $\{H'(c)\}$ of the adaptive FIR filter is calculated by performing an N-point FFT (without power normalization) upon this extended coefficient vector. Moreover, by using equation (23c), the estimated CFR $\{H(c)\}$ provided to the combination part is calculated by forcibly setting terms in $\{H'(c)\}$ that correspond to outside the 6 MHz channel band to zero. Please note that the estimated CFR calculated here is used by the combination part in the next segment processing.

The NPS estimation part estimates the NPS on the basis of the residual signal provided from the adaptive FIR filter.

Figure 6:
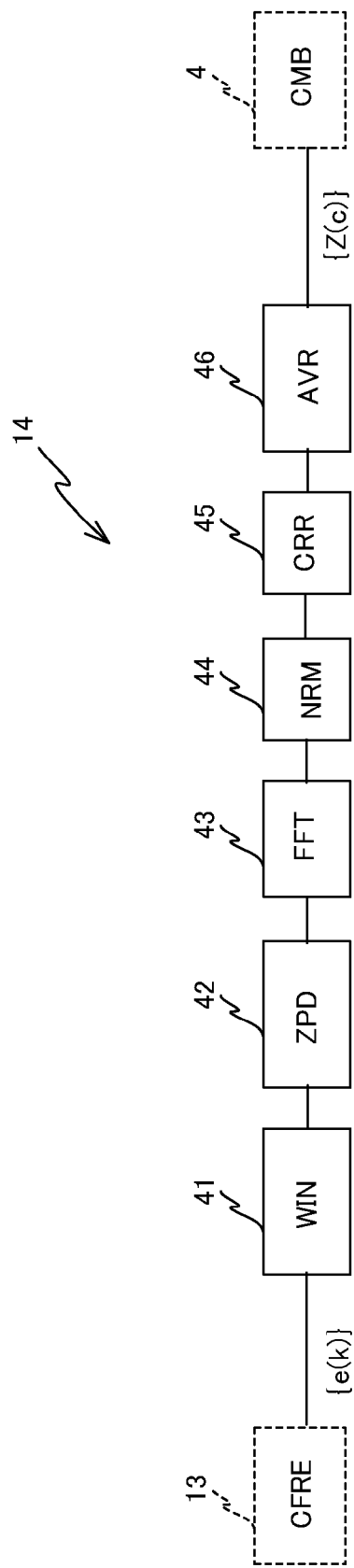
FIG. 6 is a block diagram of a NPS estimation part (NPSE) of FIG. 2.

As shown in FIG. 6, the NPS estimation part comprises a windowing part (WIN) 41, a zero padding part (ZPD) 42, a Fourier transformation part (FFT) 43, a norm calculation part (NRM) 44, a power correction part (CRR) 45, and an averaging part (AVR) 46.

The windowing part performs windowing upon the residual signal $\{e(k): k=0, 1, \ldots 831\}$ of the 832 symbols provided from the adaptive FIR filter in the processing of each segment. A raised-cosine window, a Hamming window, a Blackman window or the like may be used as a windowing function. For example, if a raised-cosine window is used, then the windowing may be performed according to the following equation:

$$e'(k)=\text{wind}(k) \cdot e(k) \text{ for } k=0,1,\ldots 831 \quad (24)$$

Here, e'(k) is the signal after windowing, and wind(k) is a raised cosine window function given by the following equation:

[Formula 9]

$$\text{wind}(k) = \sqrt{8/3} \frac{1-\cos(2\pi k/832)}{2} \quad (25)$$

The zero padding part performs zero padding at the back end of the signal after windowing, and extends it to N (2048) points.

The Fourier transformation part performs an N-point FFT upon the output of the zero padding part.

The norm calculation part calculates a norm value for each of the N-point complex numbers calculated by the FFT.

The power correction part corrects the power of the norm values, which has been decreased by the zero padding, by multiplying them by (2048/832).

And the averaging part calculates the estimated NPS by averaging the corrected norm values. This averaging may, for example, be implemented by a first order IIR filter. In this case, taking the norm value of the power after amendment as being $\{Gs(c): c=0, 1, \ldots N-1\}$, the estimated NPS $\{Zs(c): c=0, 1, \ldots N-1\}$ is calculated according to the following equation:

$$Z_s(c) = Z_{s-1}(c) + \gamma(G_s(c) - Z_{s-1}(c)) \qquad (26)$$

Here, $\gamma$ is the IIR filter coefficient. Please note that the estimated NPS calculated here is used by the combination part in the next segment processing.

Figure 7:
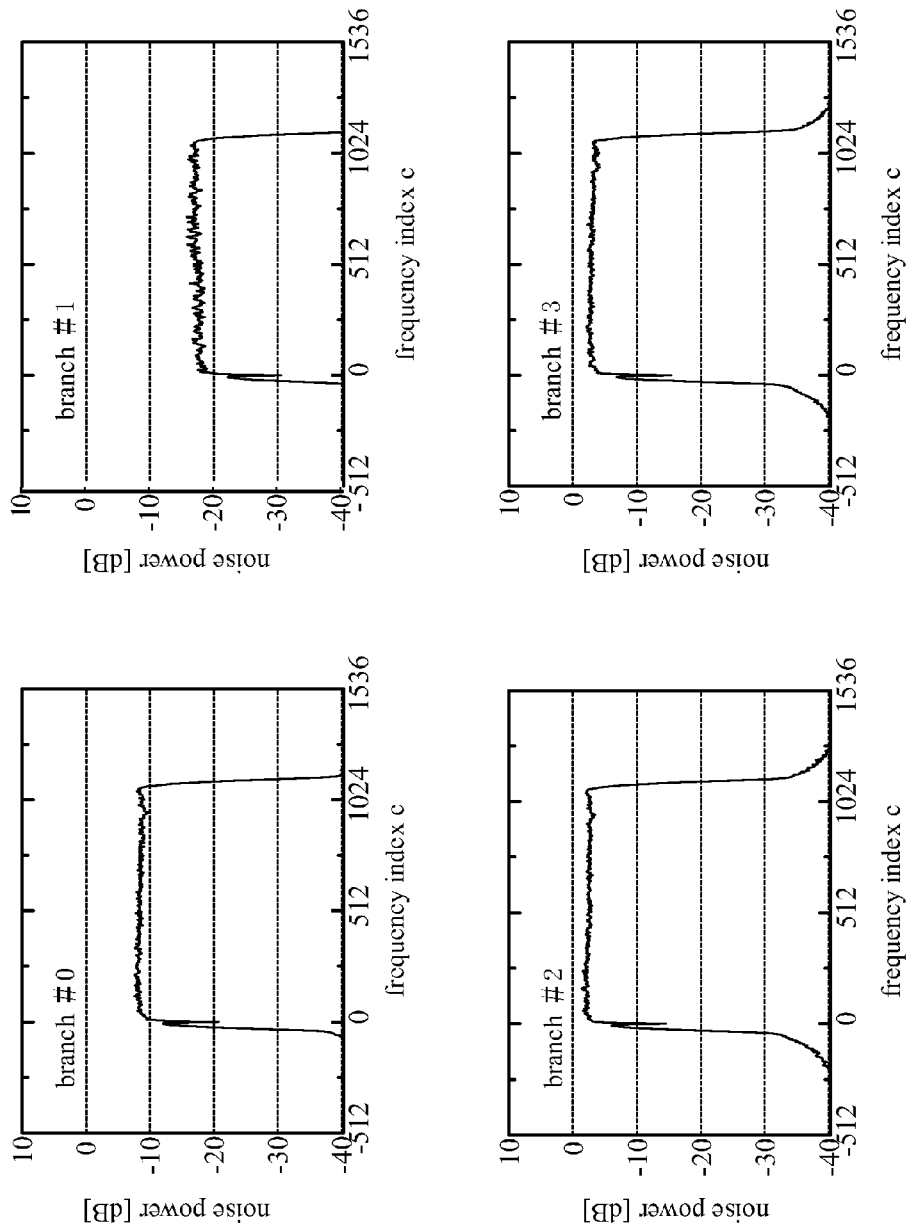
FIG. 7 is a first figure showing examples of estimated NPSs that were observed during field experiments.
Figure 8:
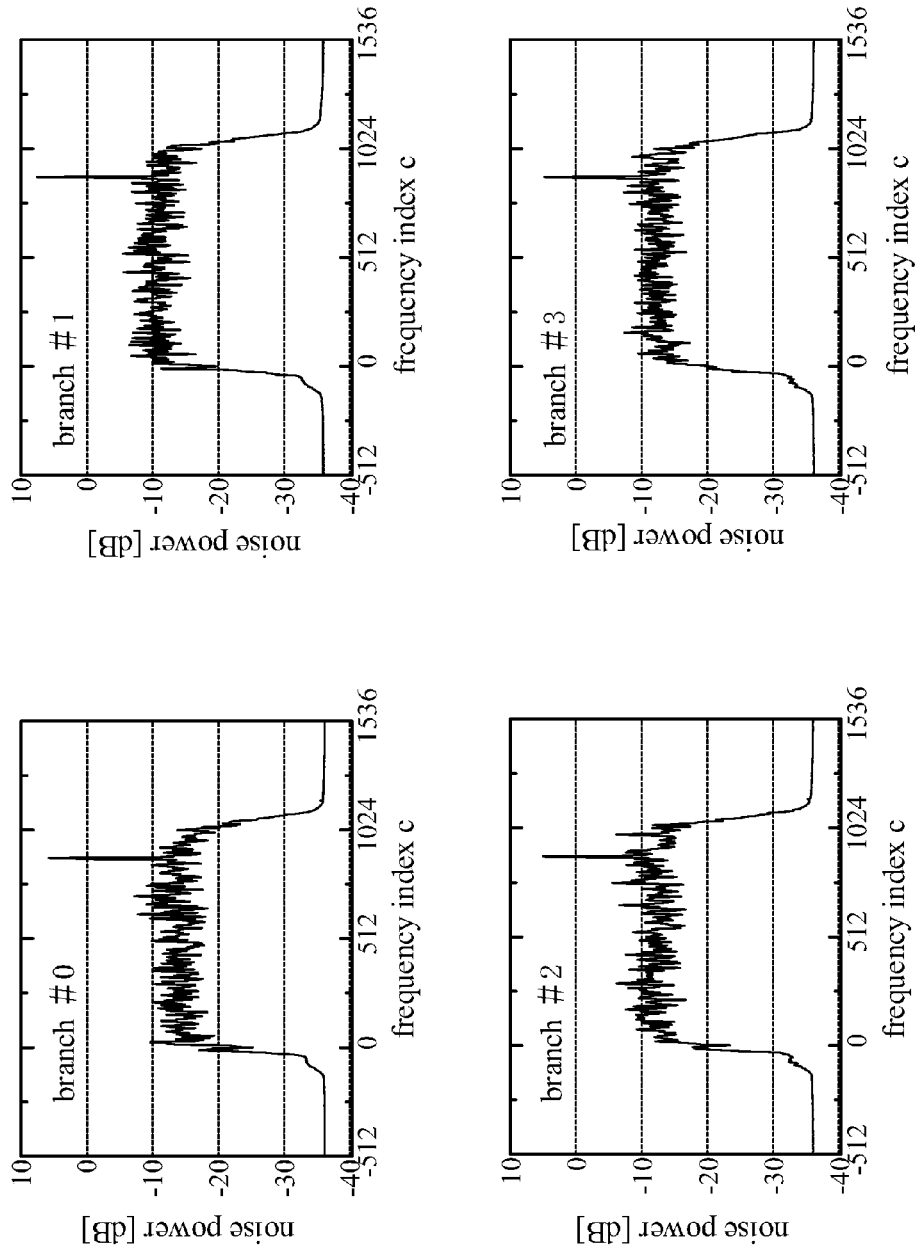
FIG. 8 is a second figure showing examples of estimated NPSs that were observed during field experiments.
Figure 9:
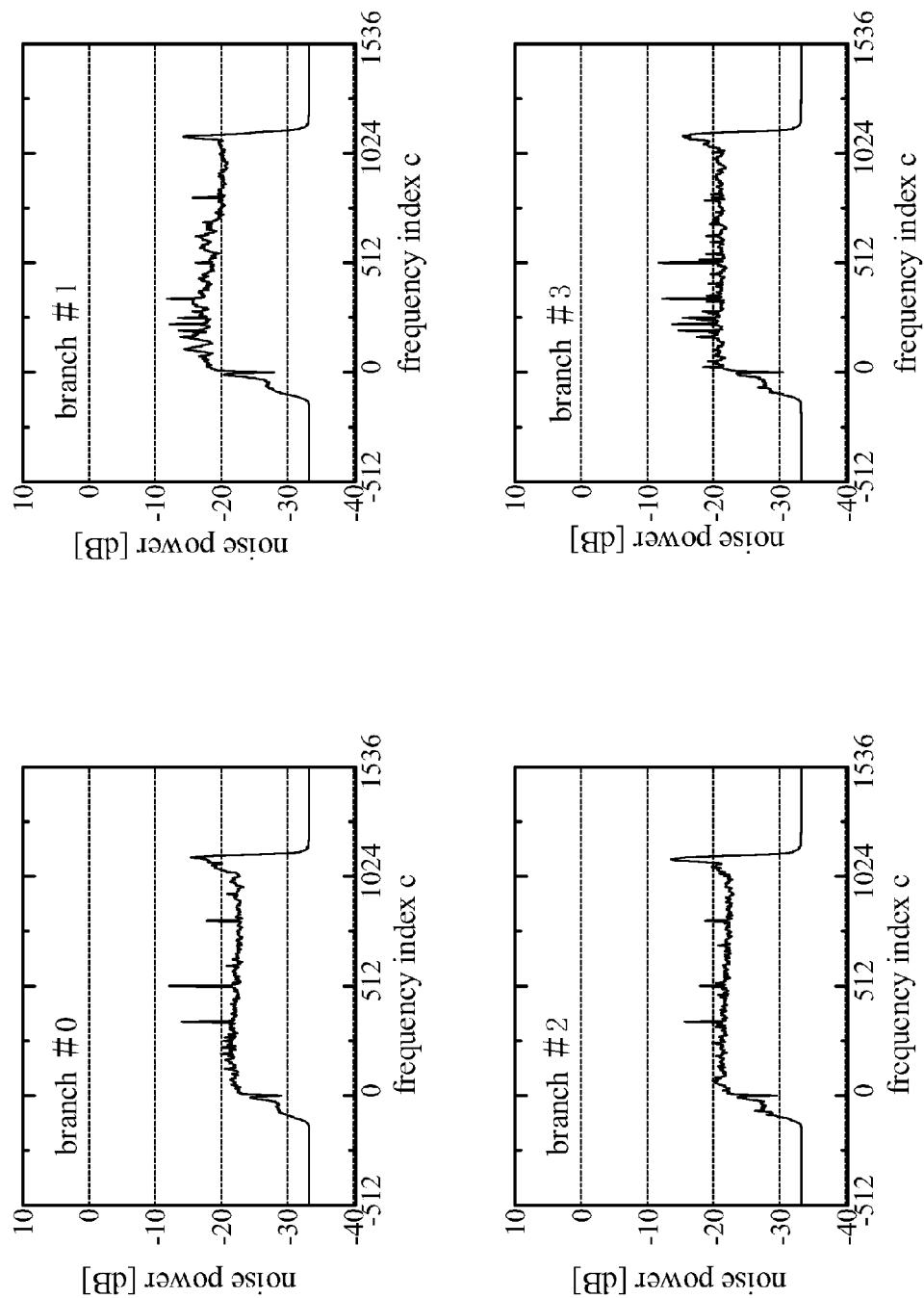
FIG. 9 is a third figure showing examples of estimated NPSs that were observed during field experiments.

Examples of estimated NPSs that have actually been observed in the field are shown in FIGS. 7 through 9.

Estimated NPSs that were observed on a freeway in a San Francisco suburb are shown in FIG. 7. In this example, it will be understood that the spectrum on each of the branches #0 through #3 is almost white, so that the frequency dependence is low. In this type of noise situation, there is no problem with a receiver that assumes the noise to be white, such as a receiver according to the prior art.

On the other hand, estimated NPSs that were observed in downtown San Francisco are shown in FIG. 8. In this example a high frequency dependence is seen in the spectrum, and this is different from the suburban case. It is supposed that this is due to the influence of frequency selective noise radiated from electronic devices of various types present in the neighborhood of the receiver. The influence of frequency selective noise is extremely great in urban areas in which large numbers of electronic devices of various types are present.

Moreover, estimated NPSs that were observed in a San Francisco suburb on UHF (Ultra High Frequency) channel 48 are shown in FIG. 9. In this example as well, large amounts of narrow band noise are seen. Since narrow band noise has been observed on the same frequency in other locations as well, it is considered that this noise is not radiation from nearby electronic devices, but is noise from oscillators that are implemented within the receiver itself.

In the case of frequency selective noise such as shown in FIG. 8 or FIG. 9, a prior art type receiver is not able to perform appropriate diversity combining. On the other hand, with the receiver of the embodiment #1, it is possible to perform appropriate diversity combining on the basis of the estimated NPS calculated for each branch, so that it is possible greatly to reduce the influence of frequency selective noise. Moreover, by using a time domain adaptive filter for the channel estimation, and by utilizing the residual signal obtained during this coefficient updating processing in a supplementary manner, the estimated NPS calculation can be performed with a relatively small amount of calculation.

Note that the correspondence between the structural elements in the Claims and the structural elements in the embodiment #1 is as follows:

"Reception apparatus": the receiver 100;

"Combining and equalizing part": the RSS calculation part 12, the combination part 4, the equalizing part 5, the IFFT part 6, and the correction part 7;

"Transmitted symbol estimation part": the trellis decoder 8;

"Channel estimation part": the data distribution part 11 and the CFR estimation part 13 (the configuration of FIG. 4);

"Noise estimation part": the NPS estimation part 14 (the configuration of FIG. 6).

Embodiment #2

Next, the embodiment #2 of the present invention will be explained. Note that, to elements having similar functions to elements shown in FIGS. 1 and 2 described above, the same reference symbols as in FIGS. 1 and 2 are appended, and explanation will be omitted as appropriate.

Figure 10:
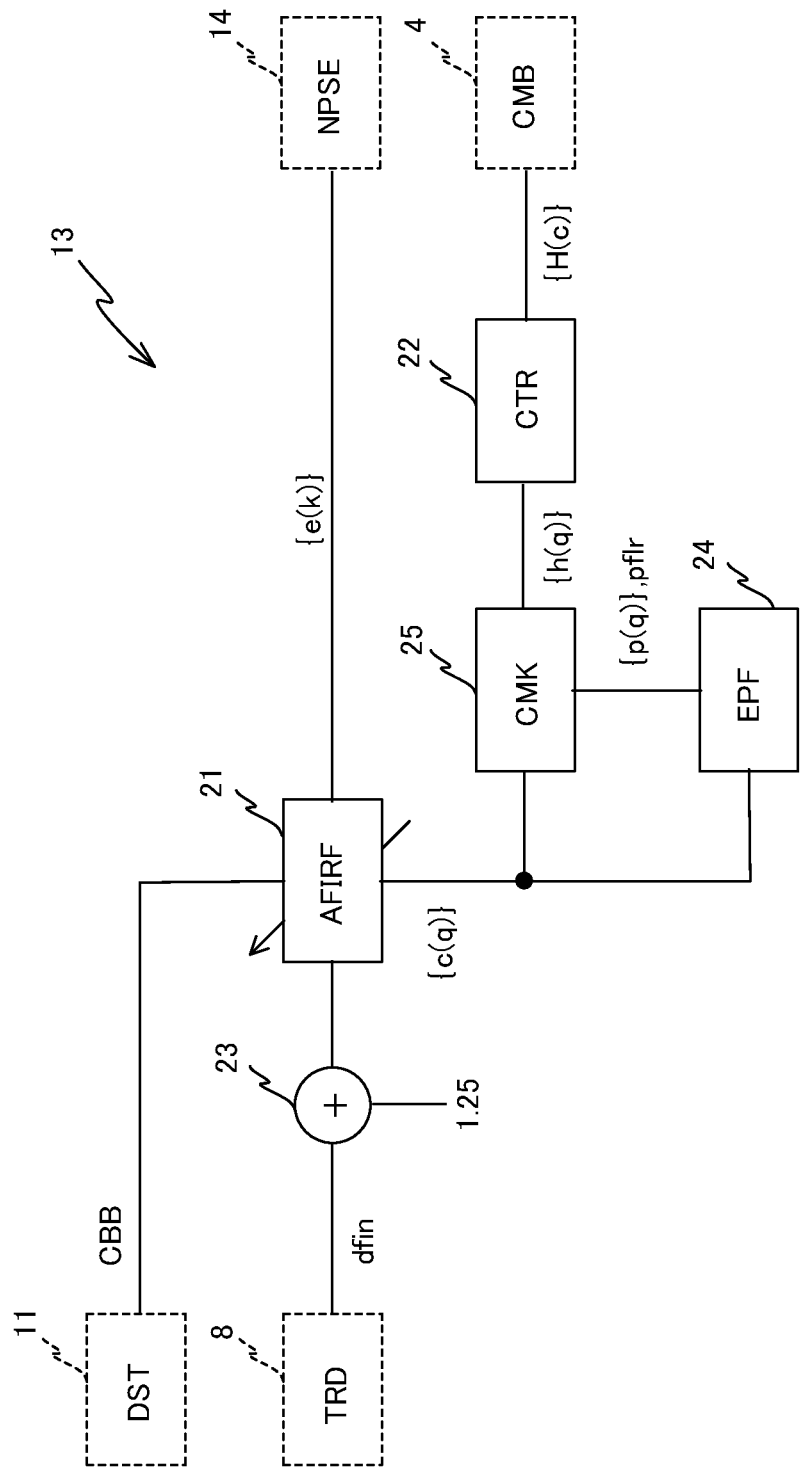
FIG. 10 is a block diagram of a CFR estimation part (CFRE) according to the embodiment #2.

As compared with the receiver of the embodiment #1 described above, the receiver of the embodiment #2 differs by having a different CFR estimation part. A block diagram of the CFR estimation part of the embodiment #2 is shown in FIG. 10. In the embodiment #2, an addition part 23, an echo profiler (EPF) 24, and a coefficient masking part (CMK) 25 are newly arranged within the CFR estimation part.

Figure 11:
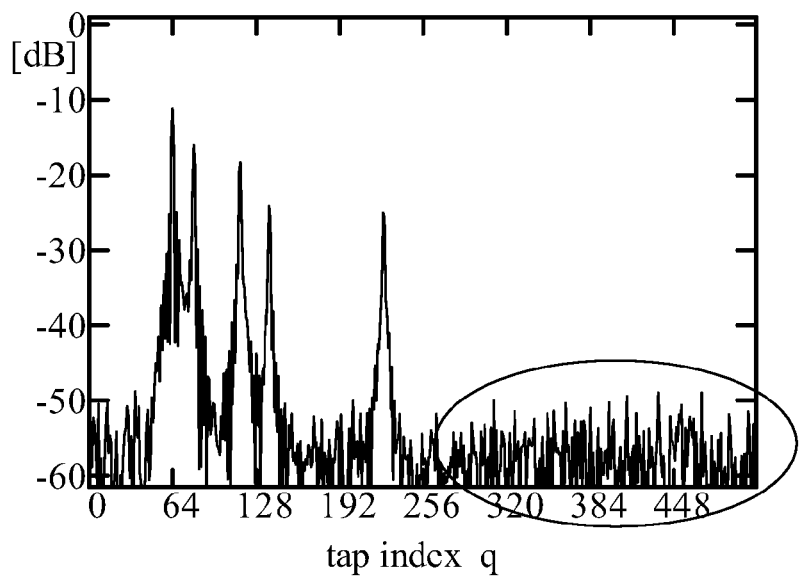
FIG. 11 is a figure showing an example of a coefficient vector before masking.

For a mobile receiver that is required to perform reception in multipath conditions of various types, the tap length of the adaptive FIR filter is set to be long. However, cases are rare in which the multipath components that are present span the entire range of the tap length. This will now be explained with an example. FIG. 11 shows an example of a coefficient vector for an adaptive FIR filter. The possibility is high that the portion marked with a circle in that figure is not a multipath component, but rather is an error component. An echo profiler and a coefficient masking part are arranged in order to eliminate this type of error component.

An echo profiler calculates a multipath power distribution, i.e. a so called echo profile, by averaging the powers of the coefficients provided from the adaptive FIR filter for each segment.

If a first order IIR filter is used for the averaging, then the echo profile $\{p(q): q=0, 1, \ldots 511\}$ is calculated for each segment by an updating calculation according to the following equation:

$$p(q) \leftarrow p(q) - \xi \cdot (p(q) - |c(q)|^2) \text{ for } q=0,1,\ldots 511 \qquad (27)$$

Figure 12:
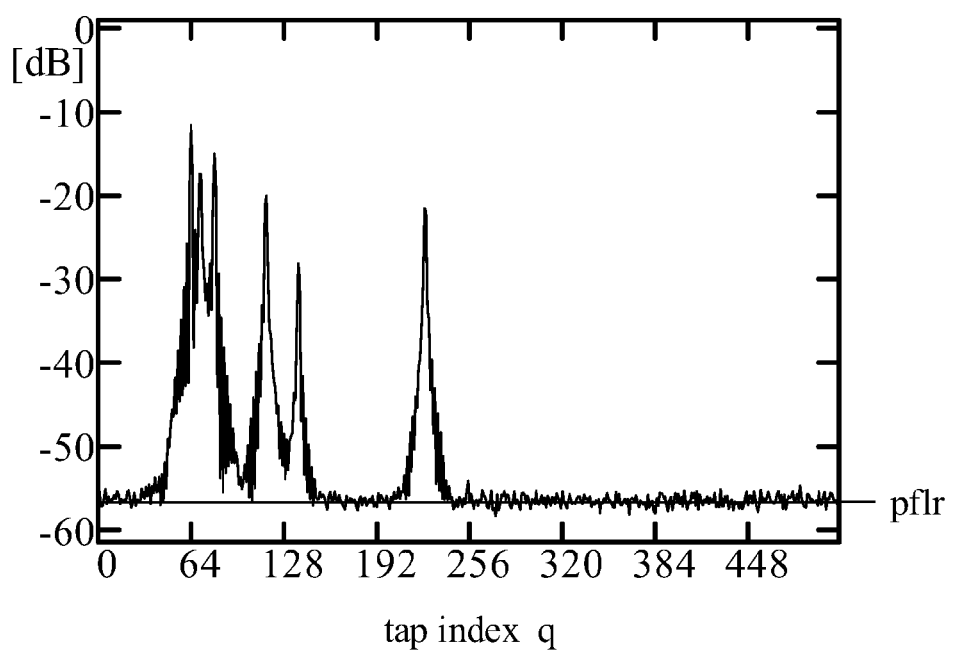
FIG. 12 is a figure for explanation of a calculated echo profile.

Here, $\{c(q): q=0, 1, \ldots 511\}$ is the coefficient vector provided from the adaptive FIR filter. Moreover, $\xi$ is the coefficient of the IIR filter. An example of an echo profile calculated in this manner is shown in FIG. 12.

The echo profiler also calculates the power floor pflr of the echo profile. In the simplest manner, pflr is calculated as being the minimum value of the 512 terms of the echo profile $\{p(q): q=0, 1, \ldots 511\}$.

Moreover, it would also be acceptable to calculate pflr as follows. First, the echo profile $\{p(q): q=0, 1, \ldots 511\}$ is divided into 16 sections of 32 taps each, and the average power of each section is calculated. The minimum among the average powers for the 16 sections calculated in this manner is taken as being pflr. By performing the calculation in this manner, it is possible to eliminate any influence of imperfections in the averaging by the IIR filter, in concrete terms to prevent the calculated value of pflr from being too small. An example of the pflr calculated using this manner is shown in FIG. 12.

The coefficient masking part performs mask processing upon the coefficient vector according to the following equation:

if $(p(q) < \text{lambda} \cdot \text{pflr})$ then $h(q)=0$, else $h(q) = ((p(q) - \lambda \cdot \text{pflr})/p(q)) \cdot c(q)$ \qquad (28)

Figure 13:
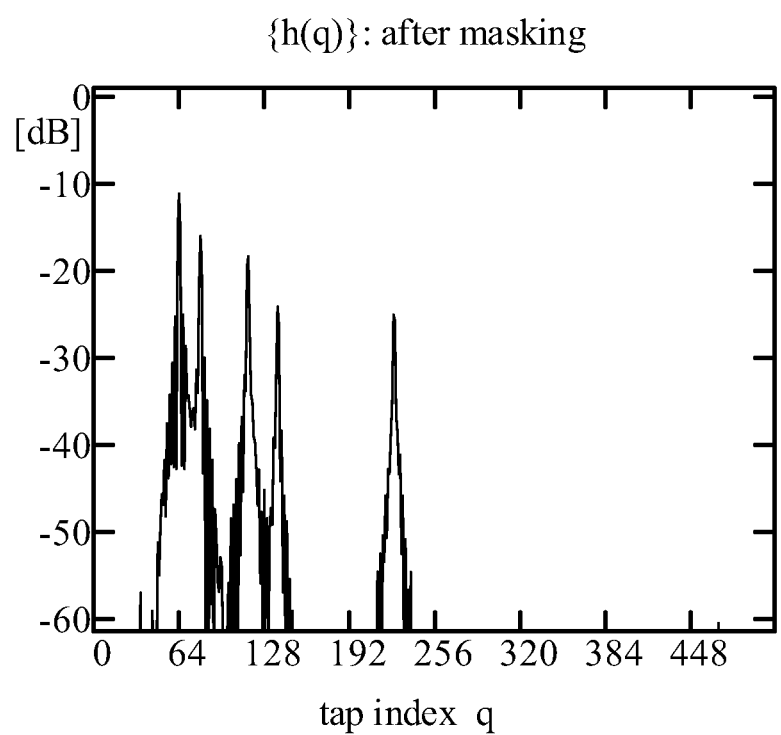
FIG. 13 is a figure showing an example of the coefficient vector after masking.

Here, the value of $\lambda$, is set to around 1 to 2. An example of the coefficient vector after masking is shown in FIG. 13. Note that it would also be possible to simplify the mask processing according to the following equation:

$$\text{if } (p(q)<\lambda \cdot p\text{ftr}) \text{ then } h(q)=0, \text{ else } h(q)=c(q) \qquad (29)$$

In the embodiment #2, the coefficient vector is provided to the coefficient transformation part after the masking obtained by the processing described above. It is possible to enhance the accuracy of channel estimation by appropriately masking the coefficient vector of the adaptive FIR filter in this manner according to the echo profile.

Note that the correspondence between the elements in the Claims and the elements in the embodiment #2 differs from the correspondence between the elements in the Claims and the elements in the embodiment #1 by the following aspect:

"Channel estimation part": the data distribution part 11 and the CFR estimation part 13 (the configuration of FIG. 10).

Embodiment #3

Next, the embodiment #3 of the present invention will be explained. Note that, to elements having similar functions to elements shown in FIGS. 1 and 2 described above, the same reference symbols as in FIGS. 1 and 2 are appended, and explanation will be omitted as appropriate.

The NPS estimation part of the embodiment #1 performed Fourier transformation upon the residual signal by employing a 2048 point FFT. However, in the embodiment #3 reduction of the amount of calculation is performed, due to reduction of the number of these FFT points.

Figure 14:
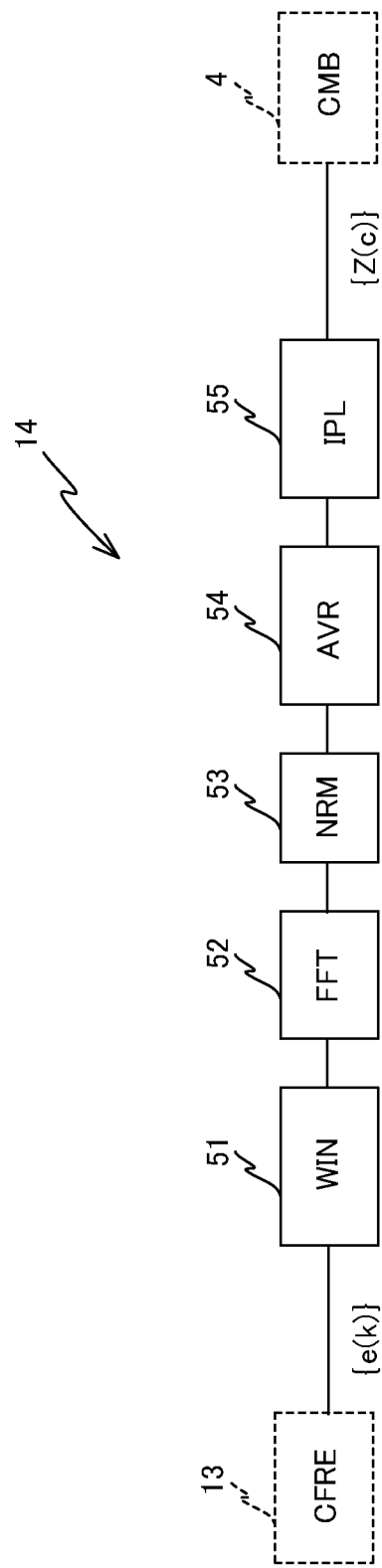
FIG. 14 is a block diagram of an NPS estimation part (NPSE) according to the embodiment #3.

As shown in FIG. 14, the NPS estimation part of the embodiment #3 comprises a windowing part (WIN) 51, a Fourier transformation part (FFT) 52, a norm calculation part (NRM) 53, an averaging part (AVR) 54, and an interpolation part (IPL) 55.

The windowing part performs windowing on the 512 points at the rear end of the residual signal $\{e(k): k=0, 1, \ldots 831\}$ of the 832 symbols provided from the adaptive FIR signal in the processing of each segment. If, for example, a raised cosine window is used, then the windowing may be performed according to the following equation:

$$e'(k)=\text{wind}(k)*e(k+832-512), \text{ for } k=0,1,\ldots 511 \qquad (30)$$

Here, e'(k) is the signal after windowing, and wind(k) is the raised cosine window function given by the following equation:

[Formula 10]

$$\text{wind}(k) = \sqrt{8/3}\,\frac{1-\cos(2\pi k/512)}{2} \qquad (31)$$

The Fourier transformation part performs a 512 point FFT upon the output of the windowing part.

The norm calculation part calculates a norm value for each of the complex numbers of the 512 points calculated by the FFT.

And the averaging part calculates a 512 point noise spectrum $\{L(i): i=0, 1, \ldots 511\}$ by time averaging the norm values. This averaging may, for example, be implemented by a first order IIR filter. The concrete calculation method is the same as in the embodiment #1, and accordingly description thereof is omitted.

Since the $\{L(i)\}$ calculated by the above is 512 points, it cannot be provided for diversity combining in that form without alteration. Thus, the interpolation part performs interpolation upon the $\{L(i)\}$, and extends them to a 2048 point noise spectrum $\{Z(c): c=0, 1, \ldots 2047\}$.

Techniques of various types may be used for this interpolation. For example, in the simplest case, a linear zero order interpolation may be employed. In this case, the interpolation may be performed according to the following equation:

$$Z(4i)=Z(4i+1)=Z(4i+2)=Z(4i+3)=L(i) \text{ for } i=0,1,\ldots 511 \qquad (32)$$

Note that the correspondence between the elements in the Claims and the elements in the embodiment #3 differs from the correspondence between the elements in the Claims and the elements in the embodiment #1 by the following aspect:

"Noise estimation part": the NPS estimation part 14 (the configuration of FIG. 14).

Embodiment #4

Next, the embodiment #4 of the present invention will be explained. Note that, to elements having similar functions to elements shown in FIGS. 1 and 2 described above, the same reference symbols as in FIGS. 1 and 2 are appended, and explanation will be omitted as appropriate.

In the embodiment #1, the estimation of CFR was performed by employing an adaptive FIR filter. By contrast, in the embodiment #4, the estimation of CFR is performed by employing an adaptive IIR filter. It should be noted that, since there are merits and also demerits both in employing an adaptive IIR filter as in the embodiment #4 and in employing an adaptive FIR filter as in the embodiment #1, accordingly no unconditional conclusion can be reached.

Figure 15:
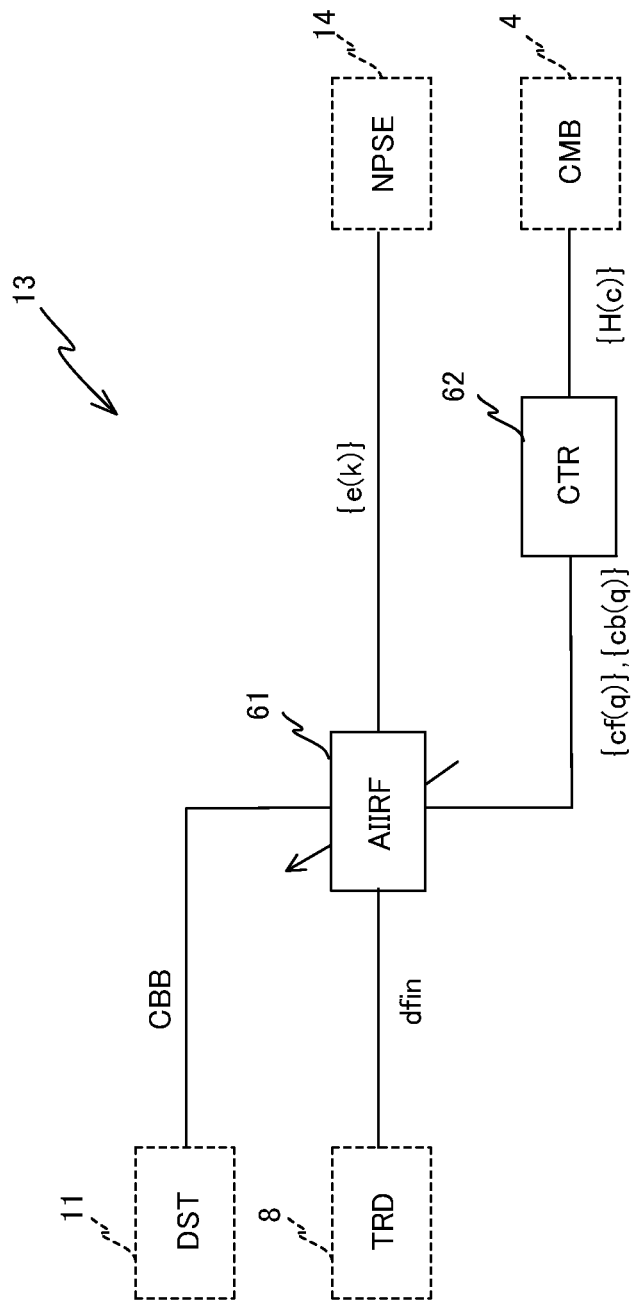
FIG. 15 is a block diagram of a CFR estimation part (CFRE) according to the embodiment #4.

The configuration of the CFR estimation part of the embodiment #4 is shown in FIG. 15. The feature that the adaptive FIR filter is replaced by an adaptive IIR filter (AI-IRF) 61 is the main difference from the embodiment #1. Moreover, together with this, the processing performed by the coefficient transformation part is also changed.

The details of the processing of the adaptive IIR filter in the embodiment #4 will now be explained. It will be supposed that, in the processing of some segment, the CBB signal provided from the data distribution part is $\{y(k): k=0, 1, \ldots 831\}$ and the sequence of final decision values provided from the trellis decoder is $\{d(k): k=0, 1, \ldots 831\}$. And it will be supposed that, in the embodiment #4, the feed forward (FF) tap length of the adaptive IIR filter is 128, the FF coefficient vector is $\{cf(q): q=0, 1, \ldots 127\}$, and the FF tap vector is $\{xf(q): q=0, 1, \ldots 127\}$. Moreover, it will be supposed that the feedback (FB) tap length of the adaptive IIR filter is 256, the FB coefficient vector is $\{cb(q): q=1, 2, \ldots 256\}$, and the FB tap vector is $\{xb(q): q=1, 2, \ldots 256\}$. In this case, the processing of the adaptive IIR filter for each symbol is represented by the following equations:

$$y'(k)=cf(0)xf(0)+cf(1)xf(1)+\ldots+cf(127)xf(127)-\{cb(1)xb(1)+cb(2)xb(2)+\ldots+cb(256)xb(256)\} \qquad (33)$$

$$e(k)=y'(k)-y(k) \qquad (34)$$

$$cf(q) \leftarrow cf(q)-\alpha e(k)xf(q) \text{ for } q=0,1,\ldots 127 \qquad (35)$$

$$cb(q) \leftarrow cb(q)-\beta e(k)xb(q) \text{ for } q=1,2,\ldots 256 \qquad (36)$$

$$\{xf(0),xf(1),\ldots xf(127)\} \leftarrow \{d(k),xf(0),\ldots xf(126)\} \qquad (37)$$

$$\{xb(1),xb(2),\ldots xb(256)\} \leftarrow \{y'(k),xb(1),\ldots xb(255)\} \qquad (38)$$

By using equation (33), the output y'(k) of the adaptive IIR filter is calculated. By using equation (34), a residual signal e(k) is calculated as being the differential between y'(k) and the actually received CBB signal. In equations (35) and (36), the FF coefficient vector and the FB coefficient vector are respectively updated according to a LMS algorithm. Due to this updating, the power of the residual signal is minimized. Note that α and β are the updating steps. Equation (37) and equation (38) respectively specify shift processing for the FF tap vector and the FB tap vector. The adaptive FIR filter of this example performs the processing described above 832 times for processing each of the segments, in other words for k=0, 1, ... 831. The residual sequence {e(k): k=0, 1, ... 831} that is obtained is provided to the NPS estimation part.

At the time point that the adaptive IIR filter has completed the segment processing described above, the coefficient transformation part of the embodiment #4 calculates the CFR on the basis of an FF coefficient vector {cf(q): q=0, 1, ... 127} and an FB coefficient vector {cb(q): q=1, 2, ... 256}.

In concrete terms, the coefficient transformation part calculates the estimated CFR according to the following equation:

$$\{cf'(q): c=0,1, \ldots 2047\} = \{cf(0), cf(1), \ldots cf(127), 0,0,0,\ldots\} \quad (39)$$

$$\{cb'(q): c=0,1, \ldots 2047\} = \{1, cb(1), \ldots cb(256), 0,0,0,\ldots\} \quad (40)$$

$$\{F(c): c=0,1, \ldots 2047\} = \text{FFT}(\{cf'(q)\}) \quad (41)$$

$$\{B(c): c=0,1, \ldots 2047\} = \text{FFT}(\{cb'(q)\}) \quad (42)$$

$$\{H'(c): c=0,1, \ldots 2047\} = \{F(c)/B(c): c=0,1, \ldots 2047\} \quad (43)$$

$$\text{If } (1024+59 \leq c \leq 2048-59) \text{ then } H(c)=0, \text{ else } H(c)=H'(c) \quad (44)$$

According to equation (39), the FF coefficient vector is extended to a N-point vector by zero padding. According to equation (40), the FB coefficient vector is extended to a N-point vector by inserting '1' at the front end of the vector and by zero padding. According to equation (41) and equation (42), N-point FFTs on these two extended coefficient vectors are performed. By using equation (43), the frequency response {H'(c)} of the adaptive IIR filter is calculated by dividing corresponding terms of the vectors after the two FFTs. Then, by using equation (44), the estimated CFR {H(c)} provided to the combination part is calculated by forcibly setting terms in {H'(c)} that correspond to outside the 6 MHz channel band to zero.

Note that the correspondence between the elements in the Claims and the elements in the embodiment #4 differs from the correspondence between the elements in the Claims and the elements in the embodiment #1 by the following aspect:

"Channel estimation part": the data distribution part 11 and the CFR estimation part 13 (the configuration of FIG. 15).

The invention claimed is:

1. A diversity reception apparatus that receives a digitally modulated signal by single carrier modulation, comprising:
   a plurality of branch processing parts to which a plurality of received signals are respectively inputted individually;
   a combining and equalizing part calculating an equalized signal from said plurality of received signals; and
   a transmitted symbol estimation part calculating an estimated transmitted symbol from said equalized signal;
   wherein each of said branch processing parts comprise:
      a channel estimation part calculating a channel characteristic, and
      a noise estimation part calculating an estimated noise power spectrum; and
   wherein:
      said combining and equalizing part calculates said equalized signal on the basis of said channel characteristic and said estimated noise power spectrum,
      said channel estimation part comprises an adaptive filter that takes said estimated transmitted symbol as filter input and generating a desired filter output signal from said received signal, and calculates said estimated channel characteristic from filter coefficients of said adaptive filter, and
      said noise estimation part calculates said estimated noise power spectrum on the basis of a residual signal calculated by said adaptive filter.

2. The diversity reception apparatus according to claim 1, wherein said combining and equalizing part calculates said equalized signal on the basis of results of Fourier transformation of each of said plurality of received signals.

3. The diversity reception apparatus according to claim 1, wherein said channel characteristic is channel frequency response.

4. The diversity reception apparatus according to claim 1, wherein said adaptive filter is an adaptive finite impulse response (FIR) filter.

5. The diversity reception apparatus according to claim 1, wherein said adaptive filter is an adaptive infinite impulse response (IIR) filter.

6. The diversity reception apparatus according to claim 1, wherein said noise estimation part calculates said estimated noise power spectrum on the basis of an error spectrum obtained by Fourier transforming a signal obtained by window extracting said residual signal.

7. The diversity reception apparatus according to claim 6, wherein said noise estimation part calculates said estimated noise power spectrum on the basis of power values of frequency components of said error spectrum.

8. The diversity reception apparatus according to claim 7, wherein said noise estimation part calculates said estimated noise power spectrum on the basis of time averages of the power values of the frequency components of said error spectrum.

9. The diversity reception apparatus according to claim 3, wherein said channel estimation part calculates said channel characteristic by Fourier transforming the filter coefficients of said adaptive filter.

10. The diversity reception apparatus according to claim 3, wherein said channel estimation part:
    calculates an echo profile by taking a time average of the power of the filter coefficients of said adaptive filter,
    performs mask processing for the filter coefficients of said adaptive filter on the basis of said echo profile that has been calculated, and
    calculates said estimated channel characteristic by Fourier transforming results of said mask processing.

11. A diversity reception method employed by a diversity reception apparatus that receives a digitally modulated signal by single carrier modulation, comprising the steps of:
    a branch processing step of performing processing upon each of a plurality of received signals;
    a combining and equalizing step of calculating an equalized signal from said plurality of received signals; and
    a transmitted symbol estimation step of calculating an estimated transmitted symbol from said equalized signal;
    wherein said branch processing step comprises:
       a channel estimation step of calculating an estimated channel characteristic, and
       a noise estimation step of calculating an estimated noise power spectrum; and
    wherein:
       in said combining and equalizing step, said equalized signal is calculated on the basis of said estimated channel characteristic and said estimated noise power spectrum, in said channel estimation step, adaptive filter processing is performed by taking said estimated transmitted symbol as filter input and by generating a desired filter output signal from said received signal, and said estimated channel characteristic is calculated from filter coefficients of said adaptive filter processing, and in said noise estimation step, said estimated noise power spectrum is calculated on the basis of a residual signal calculated by said adaptive filter processing.

12. A non-transient computer readable medium, having recorded thereon a reception program that, when executed, causes a computer in a diversity reception apparatus, which receives a digitally modulated signal by single carrier modulation, to execute the diversity reception method according to claim 11.

* * * * *